(12) United States Patent
Maurer et al.

(10) Patent No.: US 7,977,396 B2
(45) Date of Patent: Jul. 12, 2011

(54) IMPACT-ABSORBING MEMBERS FOR DYNAMIC IMPACT APPLICATIONS

(75) Inventors: Myron J. Maurer, Lake Orion, MI (US); Steven B. Swartzmiller, Clarkston, MI (US); Gavin D. Vogel, Lakeside Orion, MI (US); Andrew N. Paquet, Saginaw, MI (US); Chau V. Vo, Souffelweyersheim (FR); Charles A. Berglund, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 1183 days.

(21) Appl. No.: 11/272,217

(22) Filed: Nov. 10, 2005

(65) Prior Publication Data

US 2006/0148919 A1 Jul. 6, 2006

Related U.S. Application Data

(60) Provisional application No. 60/627,278, filed on Nov. 12, 2004.

(51) Int. Cl.
*C08J 9/00* (2006.01)
*B60R 21/04* (2006.01)

(52) U.S. Cl. ........ 521/79; 521/146; 521/147; 296/65.02; 296/187.02; 296/187.03; 296/146.7; 296/153

(58) Field of Classification Search .............. 521/79, 521/146, 147; 296/65.02, 187.02, 187.03, 296/146.7, 153
See application file for complete search history.

(56) References Cited

U.S. PATENT DOCUMENTS

| | | | |
|---|---|---|---|
| 4,510,268 A * | 4/1985 | Tonokawa et al. ......... 521/146 |
| 4,579,774 A | 4/1986 | Kuwazuru et al. | |
| 4,668,729 A | 5/1987 | Kataoka | |
| 4,721,329 A | 1/1988 | Brantman et al. | |
| 5,102,163 A | 4/1992 | Ishikawa | |
| 5,141,279 A | 8/1992 | Weller | |
| 5,395,135 A | 3/1995 | Lim et al. | |
| 5,453,454 A | 9/1995 | Alicke et al. | |
| 5,526,622 A | 6/1996 | Augustine | |
| 5,718,968 A | 2/1998 | Cutler et al. | |
| 5,720,510 A | 2/1998 | Daniel et al. | |
| 5,932,331 A | 8/1999 | Jones et al. | |
| 6,009,682 A | 1/2000 | Lehman et al. | |
| 6,213,540 B1 * | 4/2001 | Tusim et al. ............. 296/187.02 |
| 6,342,288 B1 | 1/2002 | Tada et al. | |
| 6,358,599 B1 * | 3/2002 | Deibel et al. ............. 428/308.4 |
| 6,601,902 B1 | 8/2003 | Rahmstorf et al. | |
| 6,696,504 B1 * | 2/2004 | Hayashi et al. ............. 521/79 |
| 6,708,462 B2 | 3/2004 | Pokorzynski et al. | |
| 6,730,386 B1 | 5/2004 | Stahlke et al. | |
| 2001/0027628 A1 | 10/2001 | Matsuki et al. | |
| 2003/0116993 A1 | 6/2003 | Skarb et al. | |
| 2003/0225172 A1 * | 12/2003 | Miller et al. ............. 521/50 |
| 2004/0104598 A1 | 6/2004 | Barz et al. | |
| 2004/0146704 A1 | 7/2004 | Zolfaghari | |
| 2004/0217626 A1 | 11/2004 | Barz et al. | |
| 2004/0256878 A1 | 12/2004 | Rave et al. | |
| 2004/0256879 A1 | 12/2004 | Rave et al. | |
| 2005/0088014 A1 | 4/2005 | Woodson et al. | |
| 2005/0089674 A1 | 4/2005 | Zander et al. | |

FOREIGN PATENT DOCUMENTS

| DE | 44 08 928 A1 | 9/1995 |
|---|---|---|
| GB | 1099313 | 5/1965 |
| WO | WO 99/54390 | * 10/1999 |
| WO | WO 03/102064 A2 | 12/2003 |

OTHER PUBLICATIONS

BASF Advanced Composite Systems "Ultratect PES-Foam Preliminary Data" ( 1 pg.) (undated).
"Bayfill (R) EA Energy-Absorbing Semi-Rigid Polyurethane Foam Typical Properties", undated.

* cited by examiner

*Primary Examiner* — Irina S Zemel
(74) *Attorney, Agent, or Firm* — Gary C Cohn PLLC

(57) ABSTRACT

Cushions for dynamic impact applications include anisotropic cellular polymers made in an extrusion, expanded bead or reactive foaming process. The anisotropic behavior represented by $C_E/C_T$, $C_V/C_T$ and $C_H/C_T$, wherein $C_E$, $C_V$ and $C_H$ represent the compressive strength of the cellular polymer in each of three orthogonal directions E, V and H, respectively, as measured by compressing a 25-50 mm thick sample of the cellular polymer at a strain rate of 0.08 $s^{-1}$ to 25% strain, $C_T$ represents the sum of $C_E$, $C_V$ and $C_H$, and at least one of $C_E/C_T$, $C_V/C_T$ and $C_H/C_T$ has a value of at least 0.40, up to about 0.80. The cellular polymer also preferably has density of 1.75 to 2.35 pounds/cubic foot and a compressive stress in the direction of maximum compressive strength of 290-600 kPa at 25% strain when used for headliner countermeasure applications. The cushions are useful in automotive applications such as automotive headliners, door panels, knee bolsters, pillars, headrests, seat backs, load floors or instrument panels.

12 Claims, 2 Drawing Sheets

IMPACT-ABSORBING MEMBERS FOR DYNAMIC IMPACT APPLICATIONS

CROSS-REFERENCE TO RELATED APPLICATION

This application claims benefit of U.S. Provisional Patent Application No. 60/627,278, filed Nov. 12, 2004.

BACKGROUND OF THE INVENTION

This invention relates to cushioning materials for dynamic impact applications, such as energy-absorbing materials for automobiles and other vehicles.

Polymer foams are widely used in a variety of cushioning applications. Soft polyurethane foams are commonly used in pillows, seating, mattresses and similar applications where softness and comfort are predominating factors. Thermoplastic foams such as closed-celled extruded polyolefin foams are prevalent in a wide range of packaging applications.

In most cushioning and packaging applications, the foam material is usually designed to withstand low to moderate compressive stresses. The foam is designed such that under these conditions, the strain induced in the foam as a result of the applied compressive stress during normal use is within the so-called elastic limit of the foam. Within the elastic limit, the induced strain (i.e. compression of the foam) is approximately proportional to the applied compressive stress, so that, for example, doubling the stress will induce approximately a doubling of the strain. In addition, foam that is compressed within its elastic limit will return, when the compressive force is removed, approximately the same amount of energy as was required to compress the foam. This allows the foam to absorb energy from low-to-moderate level impacts without permanently deforming the foam or significantly diminishing its ability to cushion further impact events of like magnitude. For many commonly used polymeric packaging foams, the elastic limit is exceeded when a strain of about 3-10% of the original foam thickness is exceeded.

In certain other cushioning applications, the cushion is intended to dissipate much higher levels of energy. Applications of this type notably include energy-absorbing automotive members that are intended to prevent or minimize injury to vehicle occupants in an accident. Many automotive interior parts include this sort of cushioning, including knee bolsters, instrument panels, headliners, roof pillars and doors. Quite often, these energy-absorbing cushions are designed to be used in conjunction with other energy management features, such as frontal air bags or side curtain air bags. Unlike cushions used in seating or most packaging applications, cushions used in these applications are designed to absorb high levels of energy at high strain rates. Such conditions exceed the elastic limits of the cushion, permanently deforming it in order to dissipate energy and reduce injury.

The severity of personal injuries in automotive accidents is often a result of the maximum deceleration experienced as an occupant makes contact with an automobile component. This maximum deceleration can be reduced in two ways. First, it can be reduced by lengthening the time period over which the deceleration occurs. Second, the maximum deceleration can be reduced if the energy of impact is dissipated more uniformly over that longer time period. A cushioning foam, therefore, desirably continues to absorb energy at a more or less constant rate as it is compressed to a fraction of its original thickness.

The behavior of most cellular polymers is such that the compressive stress needed to induce strain increases more or less linearly up to the elastic limit, i.e., to a strain of about 3-10% or so of the original foam thickness. After exceeding the elastic limit, the compressive stress tends to remain nearly constant up to about 20 or 30% strain, and then increases dramatically as more strain is induced to the foam. It would be more desirable if the compressive stress remains nearly constant to higher strains, such as 40-60% strain or more. This would both lengthen the time over which deceleration occurs (by distributing energy over the longer time period needed to compress the cellular polymer to the higher strain) and reduce the maximum deceleration because energy is absorbed more evenly as the cellular polymer is compressed.

An anisotropic form of polymeric foam, sometimes known as a coalesced strand foam, has been used in these applications. This foam, which is sold under the trade name Strandfoam® by The Dow Chemical Company, exhibits significantly higher compressive strength in the direction of extrusion than in orthogonal directions. This anisotropic behavior is believed to be due in part to the particular method by which the foam is made. Small diameter "strands" of a foamable resin mixture are separately extruded, and the extrudates are brought together before they cool to form a larger composite that is made up of a large number of separate strands. This coalesced strand foam performs well in dynamic impact applications, but has the drawback of being somewhat expensive. Foams of this type that have been used in dynamic impact applications have been higher density materials, which further increases cost. A further problem with these foams is that the direction of highest compressive strength is in the direction of extrusion. As most energy-absorbing cushions are rather thin in the direction of expected impact, this means that these anisotropic foams must be cut into thin slices to be used effectively. This adds fabrication costs and leads to excessive waste. This also limits the cross-sectional area of the energy-absorbing member to the cross-sectional areas of the foam as extruded, unless still further costs are incurred to assemble foam pieces into a larger cross-section.

DE 44089298 A1 describes highly anisotropic polyethersulfone foam as being useful as a shock absorbing element in helmet applications. This foam is said to have a density of 50 kg/m$^3$ or more and at that density is said to have a compressive strength of 600 kPa. This foam has extremely large and elongated cells that have a length/diameter ratio of about 10 and a diameter (smallest dimension) of about 0.8 mm.

As a result, it would be desirable to provide a cushion that is relatively inexpensive, and performs well in dynamic impact applications.

SUMMARY OF THE INVENTION

Figure 1:
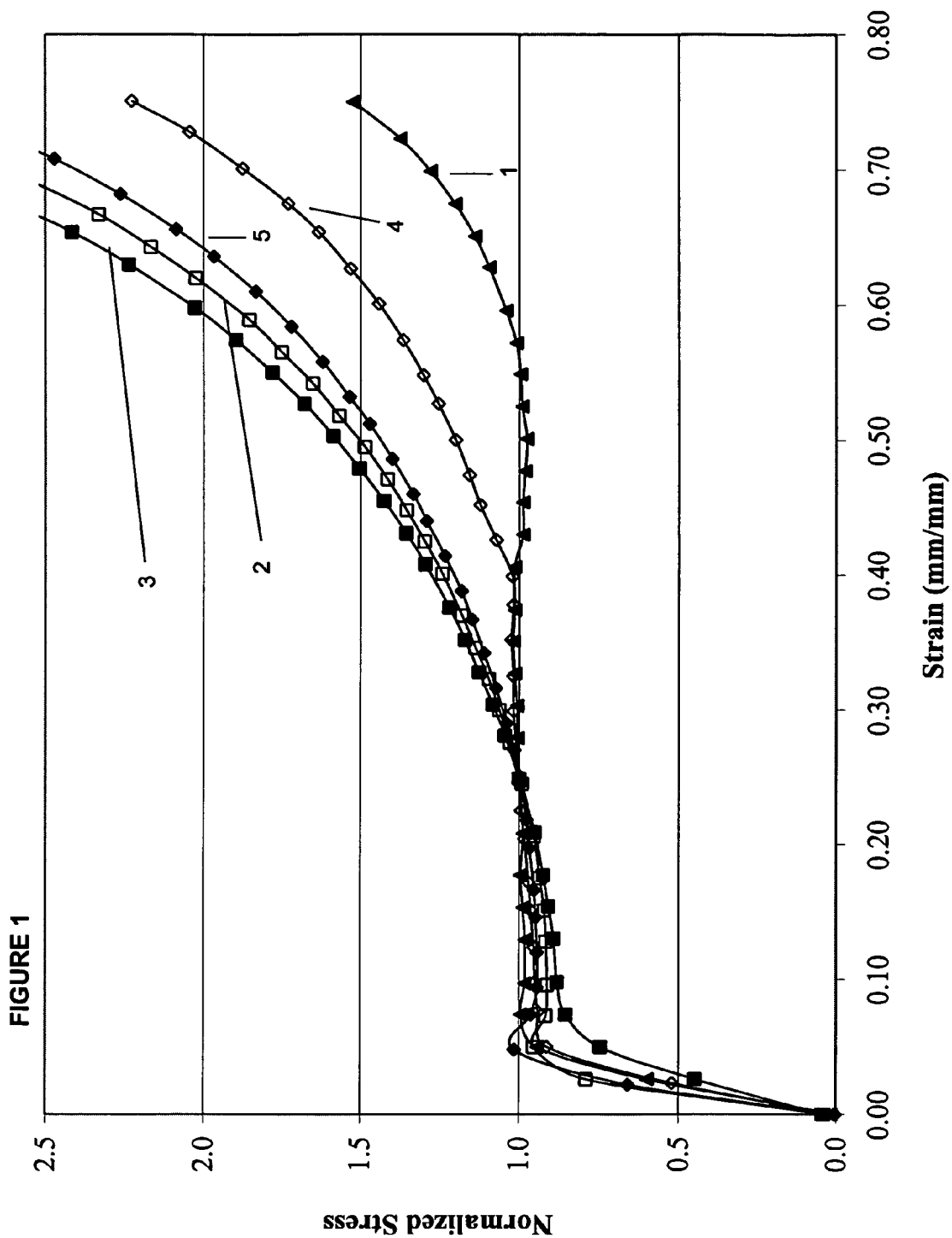
FIG. 1 is a graph showing the normalized stress vs. strain curves exhibited by certain embodiments of the invention.

This invention is invention is an impact-absorbing member for a vehicle in which during use the impact-absorbing member is expected to absorb impact forces sufficient to permanently deform the impact-absorbing member, the impact-absorbing member including a cellular polymer having a density of no greater than 2.5 pounds/cubic foot, wherein the cellular polymer exhibits anisotropic behavior represented by $C_E/C_T$, $C_V/C_T$ and $C_H/C_T$, wherein at least one of $C_E/C_T$, $C_V/C_T$ and $C_H/C_T$ has a value of from 0.40 to 0.80, wherein $C_E$, $C_V$ and $C_H$ represent the compressive strength of the foam in each of three orthogonal directions E, V and H, respectively, and $C_T$ represents the sum of $C_E$, $C_V$ and $C_H$.

This invention is also an impact-absorbing member for dynamic impact applications in which during use the impact-absorbing member is expected to absorb impact forces sufficient to permanently deform the impact-absorbing member, the impact-absorbing member including an energy-absorbing cellular polymer, wherein the cellular polymer is formed (1) by extruding a single, continuous mass of a foamable resin mixture in a direction of extrusion, (2) by expanding expandable polymer beads or (3) in a reactive foaming process, and further wherein the cellular polymer exhibits anisotropic behavior represented by $C_E/C_T$, $C_V/C_T$ and $C_H/C_T$, wherein $C_E$, $C_V$ and $C_H$ represent the compressive strength of the cellular polymer in each of three orthogonal directions E, V and H, respectively, as measured by compressing a 25-50 mm thick sample of the cellular polymer between flat-faced platens larger than the compressed surfaces of the specimen, at a strain rate of 0.08 s$^{-1}$ to 25% strain, $C_T$ represents the sum of $C_E$, $C_V$ and $C_H$, and at least one of $C_E/C_T$, $C_V/C_T$ and $C_H/C_T$ has a value of from about 0.40 to about 0.80.

This invention is also an impact-absorbing member for a vehicle in which during use the impact-absorbing member is expected to absorb impact forces sufficient to permanently deform the impact-absorbing member, the impact member including an energy-absorbing cellular polymer that is formed by extruding a mass of a foamable thermoplastic polymer composition through a single orifice in an extrusion direction E and forming the resulting extruded polymer to form it into said specialized geometry, wherein the cells of the cellular polymer have an average dimension in at least one direction V orthogonal to the direction of extrusion that meets the criteria $0.80 \geq D_V/D_T \geq 0.40$, wherein $D_V$ represents the average dimension of the cells in the said direction orthogonal to the direction of extrusion, and $D_T = D_V + D_E + D_H$, wherein $D_E$ is the average dimension of the cells in the extrusion direction E and $D_H$ is the average dimension of the cells in a direction H which is orthogonal to both E and V.

Impact-absorbing members of the invention perform unexpectedly well in dynamic impact applications. When the impact-absorbing member is oriented so the direction of highest compressive strength of the cellular polymer is closely aligned with the direction of impact, the cellular polymers exhibit nearly constant compressive stresses when compressed to a strain that is just in excess of their elastic limit to 40% or more strain, and in preferred cases to over 50% strain and even over 60% strain. This characteristic makes the foams very effective in high speed dynamic impact applications. The compressive stress is a measure of the force exerted by the foam on the member used to deform the foam, and is equal and opposite to the force exerted on the foam by the deforming member. A constant stress over this strain range means that within any part of this range, the force needed to incrementally compress the foam is approximately equal to the force needed to incrementally compress the foam within any other part of the range.

This effectiveness is manifested in the performance of these foams in various governmental, industry and insurance tests. For example, an important test for head impact protection devices is Federal Motor Vehicle Safety Standard (FMVSS) 201U. This test, described more fully below, defines a "HIC(d)" value that is intended to be indicative of the risk of head injury from a vehicle collision. According to FMVSS 201U, HIC(d) values according to this test must be below 1000, but manufacturers generally prefer values of 850 or below in order to provide an additional factor of safety and to accommodate part-to-part variations. This invention easily provides head impact protection devices that exhibit HIC(d) values well below these levels, and often achieves them using inexpensive, low density polymer foams. The impact-absorbing members in addition exhibit high compressive efficiencies at high levels of deformation, when tested under conditions described more fully below.

Another surprising aspect of the invention is that these levels of performance can be achieved even when the polymeric foam has a high open cell content. This is unexpected because the cushioning performance of many energy management foams depends significantly on having mostly closed cells that contain trapped gasses. Compressing these closed cells increases intra-cell pressures and contributes to the compressive strength of the foam. Achieving good compressive properties with a mainly open-celled cellular structure is unexpected because the contribution of intra-cellular gas pressures is greatly reduced.

DETAILED DESCRIPTION OF THE INVENTION

The impact-absorbing member of the invention includes an energy-absorbing cellular polymer. In most cases, the cellular polymer will have some specialized geometry. By "specialized geometry", it is meant simply that the external dimensions and shape of the cellular polymer are adapted in some specific way to meet specific design and/or aesthetic features required for its particular application. These adaptations may include, for example, a specific shape as is required to fit the cellular polymer to another component of the impact-absorbing member or another part or assembly, a specific shape as is required or desired for considerations of styling or appearance, or a specific shape as may be required or desirable to provide the desired impact-absorption properties, among others. In most instances, the specialized geometry is imparted to the cellular polymer by extruding or molding it into the desired shape or by fabricating (i.e., cutting, milling and/or lathing) a previously-prepared foam.

The cellular polymer is characterized by its anisotropic behavior. The anisotropic behavior of the cellular polymer is established by its compressive strength when subjected to compression in different directions. Alternatively, the anisotropic behavior of the cellular polymer is established by having cells that are on average larger in one direction than in the other two orthogonal directions, as discussed below.

Anisotropic compressive strength is established when the compressive strength of the foam is evaluated in three orthogonal directions, E, V and H. These measured compressive strengths, $C_E$, $C_V$ and $C_H$, respectively, are related to the sum of these compressive strengths, $C_T$, such that at least one of $C_E/C_T$, $C_V/C_T$ and $C_H/C_T$ has a value of at least 0.40, preferably at least 0.44, more preferably at least 0.45, even more preferably at least about 0.48 and especially at least about 0.50, up to about 0.80 (such as up to about 0.70 or up to about 0.65). The sum of $C_E/C_T$, $C_V/C_T$ and $C_H/C_T$ will of course always equal 1. For a perfectly isotropic cellular polymer, each of $C_E/C_T$, $C_V/C_T$ and $C_H/C_T$ will equal 0.33. Therefore, if any of $C_E/C_T$, $C_V/C_T$ and $C_H/C_T$ exceeds 0.33, at least one of the other two will have a value of less than 0.33. In the preferred extruded cellular polymers, the direction E is the direction of extrusion, the direction V is the direction of vertical expansion of the cellular polymer after exits the extrusion die, and the direction H is the direction of horizontal expansion of the cellular polymer after it exits the extrusion die. The directions E, V and H are arbitrary designations with respect to cellular polymers made in other processes. With extruded cellular polymers it is preferred that one or both of the values $C_V/C_T$ and $C_H/C_T$ are at least 0.40 and the value of $C_E/C_T$ is less than 0.33, as this can reduce fabrication costs and allow larger parts to be made from a single piece of the cellular polymer.

The compressive strength values $C_E/C_T$, $C_V/C_T$ and $C_H/C_T$ are separately determined by compressing a 25-50 mm thick sample of the cellular polymer between a moving flat plate and a stationary flat plate, each sized larger than area of the compressed surface of the specimen, at ~23° C. The sample is separately compressed in each of orthogonal directions E, V and H at a strain rate of $0.08$ s$^{-1}$, and the compressive strength of the cellular polymer is in each cased computed at 25% strain (i.e., the cellular polymer is compressed to 75% of its original thickness). Materials Test System or Instron compression machines are suitable for this purpose. Strain rate is defined as the velocity at which the sample is compressed (in mm/seconds) divided by the original thickness of the sample (in mm). In order to obtain a strain rate of $0.08$ s$^{-1}$, it is necessary to adjust the velocity of the moving plates in relation to the thickness of the sample. Compressive strength values $C_E$, $C_V$ and $C_H$ are calculated by dividing the transient force recorded by a load transducer at 25% strain by the cross-sectional area of the specimen normal to the compressive force. $C_T$ is the sum of $C_E$, $C_V$ and $C_H$.

Anisotropy in cell dimensions is determined using standard cell size measurement methods such as ASTM D3576. The cells are measured in each of orthogonal directions E, V and H, to determine the average dimension in each of these directions ($D_E$, $D_V$ and $D_H$, respectively). The sum of $D_E$, $D_V$ and $D_H$ is calculated and designated $D_T$. Anisotropy is indicated when any of the ratios $D_E/D_T$, $D_V/D_T$ and $D_H/D_T$ is at least 0.40, preferably at least 0.44, more preferably at least 0.45, even more preferably at least about 0.48 and especially at least about 0.50, up to about 0.80, preferably up to about 0.70 and especially up to about 0.65. As before, in the preferred extruded cellular polymers, the direction E is preferably the direction of extrusion, the direction V is the direction of vertical expansion of the foam after it is extruded, and the direction H is the direction of horizontal expansion of the foam after it is extruded. In the preferred extruded foam, the value of at least one of $D_V/D_T$ and $D_H/D_T$ is at least 0.40, and the value of $D_E/D_T$ is preferably less than 0.33.

In general, anisotropic cell structure correlates well with anisotropic compressive strength behavior, with the direction of largest cell size closely corresponding with the direction of highest compressive strength.

Cellular polymers exhibiting this anisotropic behavior can be prepared in several ways.

Thermoplastic polymers can be formed into cellular materials using extrusion methods that are adapted to impart the required anisotropic characteristics. In these extrusion methods, a melt is formed and extruded through a die to a region of lower pressure. The die suitably contains a single opening such as a slit, circular orifice or dog-bone opening. The melt typically includes the polymer, blowing agent and optionally other additives such as nucleating agents, dyes, surfactants, crosslinkers and the like. After exiting the die, the melt expands, typically in vertical and horizontal directions orthogonal to the direction of extrusion, and cools to form a cellular polymer.

Anisotropic characteristics can be imparted to an extruded cellular polymer in at least two ways. In one method, the expansion of the extruded melt is constrained in at least one direction, while the cells are allowed to expand freely in at least one orthogonal direction. This tends to produce elongated cells and a cellular polymer that has its highest compressive strength in the direction of the elongated dimension of the cells. Cell expansion can be constrained in any particular direction by introducing physical barriers that prevent full expansion of the melt in that direction while permitting free or nearly free expansion in an orthogonal direction. Typically, this method is good for producing cells that are elongated in the vertical or horizontal directions (orthogonal to the direction of extrusion). It is most preferred to use this method to produce cells that are elongated in the vertical direction.

Another method of introducing anisotropic characteristics in an extruded cellular polymer is to permit the extruded melt to expand unconstrained, and subsequently stretch or compress the resulting cellular polymer so as to elongate or shorten the cells in a particular direction. On a continuous extrusion line, this can be achieved by pulling the foam off of the line at a slightly greater or slightly lesser speed than the extrusion rate while the polymer is still somewhat soft, producing cells that are respectively elongated or compressed in the direction of extrusion. This can also be done by mechanically compressing the freshly expanded foam in the vertical or horizontal directions (i.e., orthogonal to extrusion). It is preferred to produce cells that are compressed in the direction of extrusion.

Extrusion processes for making thermoplastic foam are very well known. Specific such processes are described, for example, in U.S. Pat. Nos. 3,644,230, 4,129,530, 4,395,510, 4,554,293, 4,623,671, 4,624,969, 4,640,933, 5,059,376, 5,242,016, 5,527,573, 5,405,883, 5,567,742, 6,174,471 and 6,417,240. Specific methods for producing extruded cellular polymers with elongated cells are described, for example, in GB 1,099,313, WO 03/102064A2, U.S. Pat. No. 4,510,268, and DE 4408928A1.

Extruded foam can also be treated in a subsequent processing step to introduce anisotropic characteristics, by heating the foam to a temperature at which it can be formed, and compressing and/or elongating the foam in one direction.

The cellular polymer can also be made in a so-called "bead foam" process, wherein particulate thermoplastic resin particles containing blowing agent are heated to soften the resin and volatilize the blowing agent, whereby the individual particles expand and form a cellular mass. Such "bead foams" and methods of making them are described, for example, in U.S. Pat. Nos. 3,066,382, 3,188,264, 3,251,728, 4,839,396, 4,866,098 and 4,912,140. Anisotropic characteristics can be imparted to the resulting cellular polymer by constraining the expanding mass in at least one direction while allowing it to expand freely or nearly freely in at least one orthogonal direction. Polyethylene, polypropylene, polystyrene and polyphenylene oxide/polystyrene blends are particularly suitable polymers for this type of foam.

The cellular polymer can also be made in a reactive foaming process, in which precursor materials react in the presence of a blowing agent to form the cellular polymer. Polymers of this type are most commonly polyurethane and polyepoxides, especially structural polyurethane foams as described, for example, in U.S. Pat. Nos. 5,234,965 and 6,423,755. Anisotropic characteristics are again imparted to such foams by constraining the expanding reaction mixture in at least one direction while allowing it to expand freely or nearly freely in at least one orthogonal direction.

Injection molding methods can also be used to manufacture the cellular polymer.

The cellular polymer advantageously has several additional characteristics that make it particularly useful for dynamic impact applications. The cellular polymer advantageously exhibits compressive stress values that are nearly constant over a strain range of about 10 to at least 40% strain, when the foam is compressed at a strain rate of $0.08$ s$^{-1}$ between flat plates sized larger than the area of the compressed surfaces of the specimen. "Nearly constant" in this context means that within this range of strain, the ratio $C/C_{25}$, where C represents the compressive stress at a particular strain level and $C_{25}$ represents the compressive stress at 25% strain, is always within the range of 0.85 to 1.15. Preferably, the cellular polymer exhibits nearly constant compressive stress values over the range from 10 to at least 50% strain, and even more preferably in the range from 10 to at least 60% strain.

In addition, the cellular polymer advantageously exhibits an elastic limit of between 3 and 10% strain, when compressed at a strain rate of at least $0.08\ s^{-1}$. When compressed beyond its elastic limit, the cellular polymer becomes permanently distorted and is no longer able to return all of the energy used to compress the cellular polymer once the compressive force is released. The existence of such an elastic limit is significant, as foams without such an elastic limit will not exhibit the desired stress-strain relationship over a wide strain range, as described above.

In impact-absorbing members that are intended for head injury abatement applications, such as headliner countermeasures, helmets and the like, the cellular polymer also advantageously exhibits a compressive strength, in the direction of maximum strength, of at least 200 kPa, preferably of at least 250 kPa and more preferably of at least 290 kPa at 25% strain, up to about 700 kPa, especially up to about 600 kPa, as measured on a 25-50 mm thick sample at a strain rate of $0.08\ s^{-1}$. The density of the cellular polymer is generally selected to provide the desired compressive strength properties. Higher density cellular polymers tend to exhibit higher compressive strengths. For head injury abatement applications, the cellular polymer advantageously has a density of no greater than 2.5 pounds/cubic foot (40 kg/m$^3$), and preferably no greater than 2.35 pounds/cubic foot (37.6 kg/m$^3$). Preferably, the density is at least 1.5 pounds/cubic foot (24 kg/m$^3$). An especially preferred density is from about 1.75 to about 2.2 pounds/cubic foot (28-35.2 kg/m$^3$). It has been found that cellular polymers having these compressive strengths and densities tend to have particularly low HIC(d) values, measured according to FMVSS 201(U), as described more fully below. A particularly preferred cellular polymer for use in head injury abatement applications will have, when tested as indicated above, a compressive strength at 25% strain of 290-600 kPa in the direction of maximum compressive strength, a density of 1.5 to 2.2 pounds/cubic foot (24-35.2 kg/m$^3$), and an elastic limit of from 3-10% strain.

For Federal Motor Vehicle Safety Standard (FMVSS) 214, Lateral Impact New Car Assessment Program (LINCAP) and Insurance Institute for Highway Safety pelvic injury protection abatement applications, such as pelvic bolsters and the like, the cellular polymer advantageously exhibits a compressive strength, at 25% strain in the direction of maximum strength, of at least 150 kPa, preferably of at least 250 kPa, up to about 1000 kPa, especially up to about 900 kPa, measured on a 25-50 mm thick sample at a strain rate of $0.08\ s^{-1}$. This broad range of performance is desired in these application to protect a broad Range of anthropomorphic crash test dummies simulating a 5$^{th}$ percentile female, a 50$^{th}$ percentile male and a 95$^{th}$ percentile male. For these applications, the cellular polymer advantageously has a density of no greater than 5 pounds/cubic foot (80 kg/m$^3$) and preferably no greater than 4.5 pounds/cubic foot (72 kg/m$^3$). Preferably, the density is at least 1.5 pounds/cubic foot (24 kg/m$^3$). An especially preferred density is from about 2.1 to about 4.0 pounds/cubic foot (34-64 kg/m$^3$). These stiffer cellular polymers still tend to exhibit the desired stress-strain profile, as described before, over a wide strain range. A particularly preferred cellular polymer for use in pelvic injury protection applications will have, when tested as indicated above, a compressive strength at 25% strain of 200-900 kPa in the direction of maximum strength, a density of 2.1 to 4.0 pounds/cubic foot (34-64 kg/m$^3$), and an elastic limit of from 3-10% strain.

In thoracic abatement applications, such as thorax bolsters and the like, the cellular polymer also advantageously exhibits a compressive strength, in the direction of maximum strength, of at least 100 kPa, preferably of at least 150 kPa at 25% strain, up to about 700 kPa, especially up to about 500 kPa, measured as before. For these applications, the cellular polymer advantageously has a density of no greater than 3.0 pounds/cubic foot (48 kg/m$^3$), preferably no greater than 2.0 pounds/cubic foot (32 kg/m$^3$). Preferably, the density is at least 1.25 pounds/cubic foot (20 kg/m$^3$). An especially preferred density is from about 1.5 to about 2.0 pounds/cubic foot (24-32 kg/m$^3$). These more flexible cellular polymers still tend to exhibit the desired nearly constant compressive stress over a wide strain range. A particularly preferred cellular polymer for use in thoracic injury protection applications will have, when tested as indicated above, a compressive strength at 25% strain of 150-500 kPa in the direction of maximum strength, a density of 1.5 to 2.0 pounds/cubic foot (24-32 kg/m$^3$), and an elastic limit of from 3-10% strain.

The cellular polymer may be mainly open-celled or closed-celled. Open cell content is conveniently measured according to ASTM D6226-98. Mainly closed-cell cellular polymers, having open cell contents of from 1-35%, from 1-20%, from 1-10% or from 1-5% are useful. A surprising aspect of this invention is that cellular polymers having high open cell contents, such as at least 35%, 40% or 50% open cells, function well in this application, if the material has the anisotropic properties described before. The open cell contents of these cellular polymers may be as high as 90% or 100%.

The cellular polymer further advantageously exhibits a compressive efficiency of at least 70% and preferably at least 80% measured at 60% strain, of at least 60% and preferably at least 75% measured at 65% strain, of at least 55% and preferably at least 70% measured at 70% strain and/or at least 50% and preferably at least 65% measured at 75% strain. Compressive efficiencies of 85% or more can be obtained with the invention at 60-65% strain. Compressive efficiency is computed by compressing the foam at a strain rate of 0.08 $s^{-1}$ in the manner described before, and recording instantaneous load and crosshead displacement. Transient stress is calculated by dividing the instantaneous load by the original cross-section area of the foam specimen normal to the direction of compression. Transient strain is calculated by dividing the change in thickness by the original thickness. Compressive efficiency is then calculated using the relationship $$\text{Efficiency}(\%) = 100\% \cdot \left( \frac{\int_0^\varepsilon \sigma \cdot \partial \varepsilon}{\sigma_{max} \cdot \varepsilon} \right)$$

where $\sigma$ represents the instantaneous stress in mPa, $\varepsilon$ represents the strain in mm/mm and $\sigma_{max}$ represents the maximum stress achieved in MPa.

The cells of the cellular polymer may have an average size (largest dimension) of from about 0.05 to about 5.0 mm, especially from about 0.1 to about 3.0 mm, as measured by ASTM 3756. Cellular polymers having larger average cell sizes, of especially about 0.9 to about 3.0 mm or about 0.9 to about 2.0 mm in the largest dimension, are of particular interest. It has been found that cellular polymers having higher cell sizes within the aforementioned ranges often have better compressive efficiencies at high strain levels. This in some cases permits excellent properties to be achieved at moderate levels of orientation (such as from 0.40 to 0.50). The smallest cell dimension preferably is in the range of about 0.03 to about 0.75 mm.

The resin which constitutes the polymer phase of the foam may be any that can be formed into foam having anisotropic properties as described above. For head injury protection, pelvic injury protection and thoracic injury protection applications, the polymer is preferably one which is capable of forming a foam having a compressive strength, density and elastic limit characteristics described before.

Examples of suitable plastic resins comprise thermoplastic and thermoset resins. Suitable thermoplastic resins include low density polyethylene, high density polyethylene, linear low density polyethylene, substantially linear low density polyethylene, polypropylene, various copolymers of ethylene or propylene with other copolymerizable monomers such as acrylic acid, vinyl acetate, methacrylic acid, acrylic esters or other α-olefins, poly(alkenyl aromatic) resins, copolymers of one or more alkenyl aromatic monomers with an ethylenically unsaturated nitrile, acrylonitrile-styrene-butadiene polymers, polymers of α-olefins other than ethylene and propylene, polyesters such as polyethylene terephthalate, polybutylene terephthalate and the like, polyvinyl chloride, polycarbonates and well as other thermoplastic resins. Preferred resins are thermoplastic resins, including especially low density polyethylene, polypropylene and poly(alkenyl aromatic) resins such as polystyrene, styrenic copolymers such as polystyrene-acrylonitrile (SAN) resins and the like. Of particular interest are polystyrene and block or random copolymers of styrene and acrylonitrile, containing from about 0.1-40 wt-%, especially 10-35 wt-% and more preferably 15-33 wt-% acrylonitrile, and having a weight average molecular weight of from 70,000 to about 200,000, especially from about 80,000 to about 190,000. Suitable styrene-acrylonitrile resins of this type include resins having ~25 wt-% acrylonitrile and a $M_w$ of ~150,000, ~31 wt-% acrylonitrile and a $M_w$ of ~96,000, ~28% acrylonitrile and a $M_w$ ~100,000, ~30 wt-% acrylonitrile and a $M_w$ of about 168,000, or ~20 wt-% acrylonitrile and a $M_w$ of ~173,000.

Suitable thermoplastic resins have a molecular weight such that they can be melt processed with a blowing agent to form a cellular foam structure. Preferred thermoplastic resins are melt-processable to form cellular polymers at a temperature of about 100° C. to about 310° C. Preferred thermoplastic resins have melting temperatures of above 100° C. but less than 220° C., especially less than 160° C. Preferred thermoplastic resins form cellular polymers that are dimensionally stable to a temperature of up to 80° C., especially up to about 90° C. and preferably up to about 100° C., using the elevated temperature aging test described with respect to Examples 14 and 15 below.

Suitable thermoset resins include polyurethanes, polyepoxides, polyurethane-polyisocyanurates, phenolic resins and the like.

Blends of two or more of the foregoing can be used. The resin may be impact modified.

The polymer may contain additives that do not undesirably interfere with the foaming process or the properties of the resulting foam. Antioxidants, colorants, fillers, dyes, slip agents, flame retardants and the like are common additives.

The cellular polymer is generally formed using a blowing agent. Suitable blowing agents include both physical and chemical blowing agents. Physical blowing agents include gasses and liquids that volatilize under the conditions of the foaming process, whereas chemical blowing agents produce a gas under the conditions of the foaming process through some chemical means, usually decomposition.

Suitable physical blowing agents include carbon dioxide, nitrogen, argon, water and the like. Particularly suitable physical blowing agents include halocarbons containing 1 to 4 carbon atoms such as methyl chloride, ethyl chloride, n-propyl chloride, isopropyl chloride and trans-dichloro ethylene; hydrofluorocarbons such as methyl fluoride, difluoromethane (HFC-32), perfluoromethane, ethyl fluoride (HFC-161), 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a), pentafluoroethane (HFC-125), perfluoroethane, 2,2-difluoropropane (HFC-272fb), 1,1,1-trifluoropropane (HFC-263fb), and 1,1,1,2,3,3,3-heptafluoropropane (HFC-227ea), 1,1,1,3,3-pentafluoropropane (HFC-245fa), and 1,1,1,3,3-pentafluorobutane (HFC-365mfc). Also suitable are unsaturated or saturated aliphatic and cyclic hydrocarbons having from one to nine carbons such as methane, ethane, propane, n-butane, isobutane, n-pentane, isopentane, cyclopentane, hexane, cyclohexane, heptane, octane, propene, 1-butene, 1-pentene, isopentane and 2,2-dimethylbutane; aliphatic alcohols having from one to five carbons such as methanol, ethanol, n-propanol, and isopropanol; carbonyl containing compounds such as acetone, 2-butanone, and acetaldehyde; ether containing compounds such as dimethyl ether, diethyl ether and methyl ethyl ether. Water is sometimes used in conjunction with other blowing agents.

Suitable chemical blowing agents include azodicarbonamide, azodiisobutyronitrile, dinitrosopentamethylene tetramine, benzenesulfohydrazide, 4,4-oxybenzene sulfonyl semi-carbazide, p-toluene sulfonyl semi-carbazide, toluene sulfonyl hydrazide, barium azodicarboxylate, N,N'-dimethyl-N,N'-dinitrosoterephthalamide, trihydrazino triazine, sodium bicarbonate and citric acid.

Mixtures of these physical and chemical blowing agents can be used.

A nucleating agent (or cell control agent) can be used to help control the size of the cells. Cell control agents include finely particulate solids such as talc as well as mixtures of sodium bicarbonate with citric acid or sodium citrate.

The cellular polymer may or may not contain a fire retardant package, depending on the nature of the polymer and of the application requirement. Suitable fire retardants are aliphatic or aromatic halogenated fire retardant, phosphorous flame retardants or nitrogen containing fire retardant. A single fire retardant or combinations of two or more fire retardants may be used, in pure form or in the compound form. The flame retardant can also be used in combination with one or more flame retardant synergists.

Suitable halogenated flame retardants are well-known in the art and include but are not limited to hexabromocyclododecane, tris(2,3-dibromopropyl)phosphate, tetrabromocyclooctane, dibromo ethyl dibromo cyclohexane, pentabromochlorocyclohexane, 1,2-dibromo-4-(1,2-dibromoethyl)cyclohexane, hexabromo-2-butene, 1,1,1,3-tetrabromononane, tris (2,3-dibromo isopropyl) isocyanurate, dibromo neopentyl glycol, tribromo neopentyl alcohol, pentaerythrityl tetra bromide, 2,4,6-tribromophenyl aryl ether, tetrabromobisphenol-A (TBBA), tetrabromobisphenol A bis (2,3-dibromopropyl ether), tetrabromobisphenol A-diallyl ether, decabromodiphenyl ethane, brominated trimethylphenylindane, hexabromodiphenyl ethers, octabromodiphenyl ethers, decabromodiphenyl ethers, decabromodiphenyl ethanes, 1,2-bis(tribromophenoxy)ethanes, 1,2-bis(pentabromophenoxy) ethanes, di-2-ethylhexyl ester of tetrabromophthalate, brominated trimethylphenyl indane, tris(tribromoneopentyl)phosphate, ethylene(N,N')-bis-tetrabromophthalimides, tetrabromophthalic anhydrides, hexabromobenzenes, brominated indanes, brominated phosphate esters, brominated polystyrenes, brominated epoxy resins, and polymers of brominated bisphenol-A and epichlorohydrin, and mixtures thereof, or halogenated flame retardants with similar kinetics.

Examples of phosphorous compounds include, but are not limited to 1) phosphates selected from triphenyl-phosphate, tributylphosphate, triethylphosphate, trimethylphosphate, tripropylphosphate, trioctylphosphate, diphenyl methylphosphate, tris-(2-ethylhexyl)phosphate, isodecyl diphenylphosphate, isooctyl diphenylphosphate, bisphenyl diphenylphosphate, resorcinol di-cresyl phosphate, trixylyl phosphate or triisopropylphenylphenylphosphate; 2) phosphonates; 3) phosphinates; 4) phosphine oxides; 5) phosphines; 6) poly phosphoric acid ammonium and 7) phosphonium salts of the formula $R_4PX$, wherein each R is independently selected from substituted or unsubstituted, saturated or unsaturated, branched or straight-chain aliphatic moieties or substituted or unsubstituted aromatic moieties and X is a suitable counter ion.

A flame retardant synergist is an inorganic or organic compound which enhances the effectiveness of flame retardants, especially halogenated flame retardants. Examples of inorganic flame retardant synergists include, but are not limited to, metal oxides (e.g., iron oxide, tin oxide, zinc oxide, aluminum trioxide, alumina, antimony trioxide and antimony pentoxide, bismuth oxide, molybdenum trioxide, and tungsten trioxide), metal hydroxides (e.g. aluminum trihydrate, magnesium hydroxide), graphite and expandable graphite, zinc borate, antimony silicates, zinc stannate, zinc hydroxystannate, ferrocene and mixtures thereof. Examples of organic flame retardant synergists include, but are not limited to dimethyldiphenylbutane (or dicumyl), 3,4-dimethyl-3,4-diphenyl hexane, poly-1,4-di-isopropyl benzene (or polycumyl), isocyanuric acid, halogenated paraffin, phosphorous compounds, and mixtures thereof.

Commercially available polystyrene foams that are conveniently fabricated into an impact-absorbing member of the invention include, for example, STYROFOAM® FREEZERMATE™ polystyrene foam; STYROFOAM® FLOORMATE™ polystyrene foam, STYROFOAM® Highload 40, Highload 60 and Highload 100 polystyrene foams, all available from The Dow Chemical Company; FOAMULAR™ 250, 400, 600 and 1000 polystyrene foams, available from Owens Corning, GreenGuard™ CM polystyrene foams, available from Pactiv and STYRODUR™ 2800C, 3035CS, 4000CS and 5000 CS polystyrene foams, available from BASF Aktiengesellschaft.

The impact-absorbing member of the invention can be formed using a single section of cellular polymer or from an assembly of two or more sections of cellular polymer. When two or more sections of cellular polymer are used, the individual sections may be of the same or different cellular materials, providing they meet the criteria of anisotropy described before. The preferred impact-absorbing member is a single layer of cellular material. The impact-absorbing member of the invention may include additional components, such as a rigid support, or "reactive surface", against which the foam will be compressed during impact. The impact absorbing member may also include a decorative fascia or other aesthetic or functional components.

The impact-absorbing member of the invention is adapted for use in dynamic impact applications, in which the member is intended to be exposed to impact conditions that will compress it beyond its elastic limit, thereby dissipating energy while permanently deforming the member. Many applications of this type are various safety management parts and assemblies for vehicles such as automobiles, trucks, vans, trains, airplanes, helicopters, snowmobiles and the like, where occupant safety in event of a collision is a concern. Specific vehicular applications include vehicle occupant injury countermeasures such as those used in interior portions (passenger compartments) of the vehicle. These applications include, for example, headliner countermeasures, door panels and components thereof such as pelvic bolsters, armrests and thorax bolsters, knee bolsters, pillars, headrests, seat backs, load floors and instrument panels.

In many of these foregoing applications, the member is designed to dissipate energy that comes from a certain direction. In such cases, the cellular polymer is desirably oriented within the member such that the direction of its greatest compressive strength is somewhat aligned with the direction of expected impact. The direction of compressive strength and direction of expected impact are desirably within 45° of each other, preferably within 20° of each other and even more preferably within 15° of each other.

When used in head injury abatement applications, a impact-absorbing member of the invention also suitably exhibits a HIC(d) value, calculated according to FMVSS 201U, of no greater than 1000, preferably no greater than 850, more preferably no greater than 800 and especially no greater than 750 when tested as a ~25-mm thick sample against a sheet metal fixture with a 3"×16" (7.5×41 cm) prototype sheet metal section (Body-in White (BIW)) that exhibits a HIC(d) value of ~1430 in the absence of any passive energy absorbing countermeasure. In some instances, HIC(d) values of below 700 are obtained. In accordance with FMVSS 201U, the member is subjected to a component-level head impact test against an experimental side rail body-in-white fixture. A Hybrid III free motion headform equipped with three piezoresistive accelerometers arranged in a Cartesian coordinate system is launched against the member at an impact velocity of approximately 24 km/hr. Acceleration at the center of gravity of the headform is calculated continuously from the readings of the individual accelerometers during the period of acceleration. HIC(d) is calculated according to the expression $$HIC(d) = 0.75446 * HIC + 166.4,$$

$$\text{where } HIC \text{ is } HIC = \left[\frac{1}{t_2 - t_1} \cdot \int_{t_1}^{t_2} a_R \cdot dt\right]^{2.5} \cdot (t_2 - t_1)$$

in which $a_R$ is the resultant acceleration magnitude in units of g's at the center of gravity of the headform and $t_2$ and $t_1$ are any two points in time during the impact event separated by no more than 36 milliseconds.

The following examples are provided to illustrate the invention but are not intended to limit the scope thereof. All parts and percentages are by weight unless otherwise indicated. All head impact testing is conducted with a nominal foam thickness of 25 millimeters and a 3'×16' (7.5×41 cm) reactive surface unless otherwise noted.

Examples 1 and 2

Cellular Polymer Example 1 is prepared from a commercially available polystyrene foam known as Styrofoam® Freezermate™, having a density of about 29.5 kg/m². This product is prepared by extruding a foamable mass through a single die. It has less than 5% open cell content. This product is designed so that its compressive strength is greatest in the vertical direction (the direction of foam rise as it is extruded). $C_E/C_T$, $C_V/C_T$ and $C_H/C_T$ are determined to be 0.198, 0.568 and 0.234 respectively, for this product, where E, V and H are the extrusion, vertical and horizontal directions, respectively.

The compressive stress is measured as this product is compressed at a strain rate of 0.08 s$^{-1}$ to 60-70% strain. This is repeated in each of the extrusion, horizontal and vertical directions. Results are as shown graphically in FIG. 1, with the data in each case being normalized by dividing by the transient stress at 25% strain. Reference numeral 1 indicates the compressive stress response in the vertical direction (i.e., direction of highest compressive strength). As shown in FIG. 1, compressive stress in this direction rises sharply up to the elastic limit at about 5% strain, and then stays nearly constant until 60% or more strain is achieved. This is a very desirable response for dynamic impact applications. In the horizontal and extrusion orientations (indicated by reference numerals 2 and 3, respectively), compressive stress again rises sharply to the elastic limit, but then continues to rise as the sample is strained further. This data suggests that this foam will perform well in high dynamic impact applications if oriented with the vertical direction aligned with the direction of expected impact.

Compressive efficiency of Cellular Polymer Example 1 is determined in the method described above as ~91% at 60% strain, ~85% at 65% strain, ~77% at 70% strain and ~67% at 75% strain.

A sample of Cellular Polymer Example 1 exhibits a HIC(d) value of 724, when oriented with its vertical direction in the direction of impact, against a prototype fixture that exhibits a BIW HIC(d) value of 1,430 in the absence of any passive energy absorbing countermeasure.

Cellular Polymer Example 2 is prepared from a polystyrene foam boardstock commercially available commercially available as Styrofoam® 1½" Blue Board. This product is prepared by extruding a foamable mass through a single die. Its density is about 25.3 kg/m$^2$. It has less than 5% open cells. Its highest compressive strength is in the vertical direction, $C_V/C_T$ being 0.443.

The compressive stress of Cellular Polymer Example 2 is measured while compressing it at a strain rate of 0.08 s$^{-1}$ to 60-70% strain, in the same manner as described for Example 1. Results are as shown graphically in FIG. 1, with the data being normalized by dividing by the compressive stress at 25% strain. Reference numeral 4 indicates the compressive stress response in the vertical direction (i.e., direction of highest compressive strength). In this case compressive stress rises sharply up to the elastic limit at about 5% strain is reached, and then stays nearly constant until about 40% strain is achieved. In the horizontal orientation (indicated by reference numeral 5), compressive strength again rises sharply to the elastic limit, but then continues to rise as the sample is strained further.

A sample of Cellular Polymer Example 2 exhibits a HIC(d) value of approximately 753, when oriented with its vertical direction in the direction of impact, against a prototype fixture that exhibits a body-in-white (BIW) HIC(d) value of 1,430 in the absence of any passive energy absorbing countermeasure.

Example 3

Cellular Polymer Example 3 is prepared from a commercially available polystyrene foam, sold as Styrofoam® 40 HL. This product is prepared by extruding a foamable mass through a single die. Cellular Polymer Example 3 has a density of about 30.4 kg/m$^2$ and less than 5% open cell content. $C_E/C_T$, $C_V/C_T$ and $C_H/C_T$ are determined to be 0.278, 0.447 and 0.271, respectively, for this product, where E, V and H are the extrusion, vertical and horizontal directions, respectively. This product is therefore somewhat less oriented than Cellular Polymer Example 1. It has somewhat larger cells than do either of Cellular Polymer Examples 1 or 2.

Figure 2:
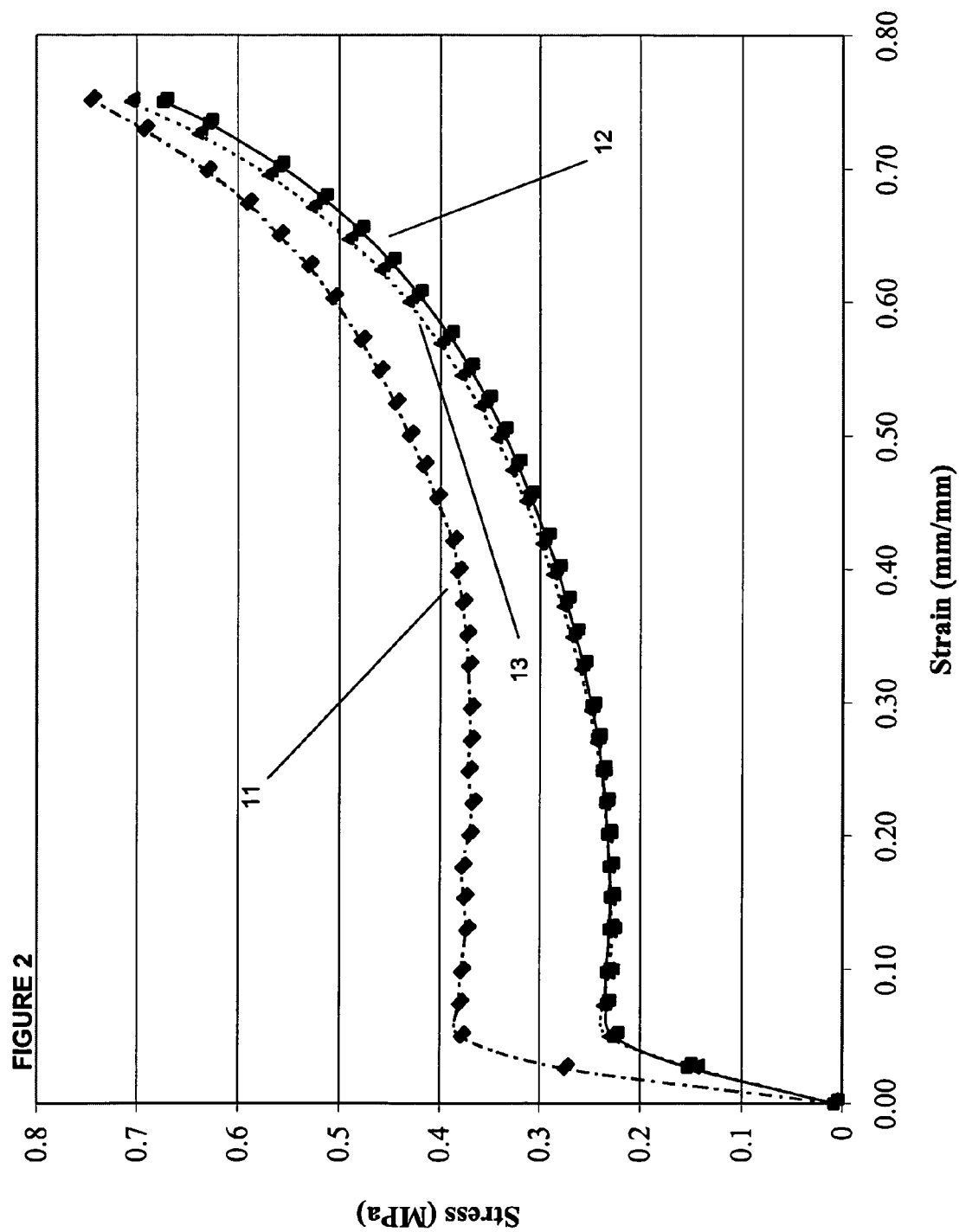
FIG. 2 is a graph showing the stress/strain curves exhibited by an embodiment of the invention.

The compressive stress required to compress this product is measured as described in Example 1. Results are as shown graphically in FIG. 2, with the data not being normalized in this case. Reference numeral 11 indicates the compressive stress response in the vertical direction. As shown in FIG. 1, compressive stress in this direction rises sharply up to the elastic limit at about 4% strain, and then stays nearly constant until about 45% strain is achieved. In the extrusion and horizontal orientations (indicated by reference numerals 12 and 13, respectively), compressive stress again rises sharply to the elastic limit, but then continues to rise as the sample is strained further. This data suggests that this foam will perform well in dynamic impact applications if oriented with the vertical direction aligned with the direction of expected impact.

A sample of this Cellular Polymer Example 3 exhibits a HIC(d) value of 720, when the vertical direction of the foam is oriented in the direction of impact and tested against a prototype fixture that exhibits a BIW HIC(d) value of 1,430 in the absence of any passive energy absorbing countermeasure.

Examples 4-19

Cellular Polymer Examples 4-19 and Comparative Samples A, B and C are prepared from various oriented foams as described in the following table. Cellular Polymer Examples 4-19 are all polystyrene foams prepared by extruding a foamable mass through a single orifice. All Examples and Comparative Samples are evaluated for compressive strength in three orthogonal directions (extrusion, vertical and horizontal), with the highest of these values, together with orientation, indicated in the table. Density and HIC(d) values are also determined as for Example 1 and are as reported in the table, with HIC(d) values being measured against a prototype fixture that exhibits a BIW HIC(d) value of 1,430 in the absence of any passive energy absorbing countermeasure.

| | | Property | | | | |
|---|---|---|---|---|---|---|
| Ex. No. | Density, kg/m$^3$ | Max. Comp. Strength, kPa | Orientation, direction/%[1] | | HIC (d) | Comment. All cell sizes are average largest dimension. |
| 4 | 29.8 | 221 | E | 42.0 | 935 | Commercial floral and craft grade |
| 5 | 30.1 | 263 | V/H | 42.6 | 839 | Commercial floral and craft grade, 1.24 mm cell size. |
| 6 | 35.4 | 379 | V | 41.9 | 713 | 0.933 mm cell size |

-continued

| Ex. No. | Density, kg/m³ | Max. Comp. Strength, kPa | Orientation, direction/%[1] | | HIC (d) | Comment. All cell sizes are average largest dimension. |
|---|---|---|---|---|---|---|
| 7 | 32.2 | 340 | H | 50.2 | 619 | Closed cell foam, 0.993 mm cell size |
| 8 | 29.8 | 457 | V | 59.3 | 701 | Higher density version of Example 2 with more orientation, 0.31 mm cell size |
| 9 | 38.1 | 473 | V | 47.6 | 704 | Commercial grade insulation product, 0.316 mm cell size |
| 10 | 38.3 | 469 | V | 47.1 | 702 | Commercial grade insulation product, 0.367 mm cell size |
| 11 | 38.6 | 484 | V | 41.1 | 754 | <5% open cell, $CO_2$ blown, 0.154 mm cell size |
| 12 | 32.6 | 355 | V | 56.1 | 711 | <5% open cell, $CO_2$ blown, 0.171 mm cell size |
| 13 | 37.1 | 582 | V | 61.2 | 767 | <5% open cell, $CO_2$ blown, 0.13 mm cell size |
| 14 | 27.0 | 291 | V | 45.0 | 769 | ~50% open-cell foam, 0.358 mm cell size |
| 15 | 33.2 | 453 | V | 51.6 | 724 | >50% open cell, 0.141 mm ell size |
| 16 | 34.2 | 547 | V | 56.1 | 781 | Commercial insulating foam for flooring and freezer applications, 0.207 mm cell size |
| 17 | 42.8 | 792 | V | 55.1 | 952 | High density foam for flooring and freezer applications, 0.204 mm cell size |
| 18 | 31.5 | 278 | V | 45.1 | 859 | Commercial grade product from Pactiv, 0.24 mm cell size |
| 19 | 38.0 | 452 | V | 42.2 | 844 | Commercial grade product from Owens Corning, 0.25 mm |
| A* | 31.4 | 265 | Isotropic | ~33 | 867 | Expanded PPO/PS bead foam |
| B* | 56.8 | 683 | Isotropic | ~33 | 966 | Expanded PPO/PS bead foam |
| C* | 14.3 | 117 | Isotropic | ~35 | >1000 | Expanded PS bead foam |

*Comparative.
[1] E, V, H refer to extrusion, vertical and horizontal directions, respectively.
% refers to the maximum of $C_E/C_T$, $C_V/C_T$ and $C_H/C_T$.

Example 5 and Comparative Example A illustrate the effects of orientation. Example 5 is moderately oriented, and has a density and maximum compressive strength similar to that of Comparative Example A. However, its HIC(d) value is 839 versus 867 for Comparative Sample A, indicating a ~3% improvement despite the moderate orientation and somewhat low maximum compressive strength.

The data in the foregoing table suggest that cellular polymers having a maximum compressive strength in the range of about 250-700 KPa, especially in the range of 290-600 KPa, provide optimal HIC(d) values. As the maximum compressive strength becomes higher, the cellular polymer becomes much stiffer and HIC(d) values tend to increase, as indicated with Example 17. Lower maximum compressive strength cellular polymers tend to exhibit higher HIC(d) values, as indicated by Examples 4 and 18, and somewhat by Example 5. Orientation is believed to permit the polymer to achieve these maximum compressive strengths at low densities, which is desirable from cost and weight standpoints. The density is desirably below 2.5 pounds/cubic foot (40 kg/m³), and especially from about 1.75-2.2 pounds/cubic foot (28-35.2 kg/m³). As shown by Examples such as 7, 8, 12 and 13, low HIC(d) values, high maximum compressive strength values can be achieved at low cellular polymer densities when the cellular polymer is oriented to 50-65%. Orientations of at least 50% tend to give very good results.

Examples 6 and 7 are notable because these cellular polymers have cells with an average size of ~1 mm in the longest direction. Larger cell size appears to provide a benefit in HIC(d) value, even when the cellular polymer is only moderately oriented, as in Example 6. When a ~1-2 mm cell size is combined with orientation above 50%, as shown in Example 7, extremely good HIC(d) values are obtained.

Examples 14 and 15 surprisingly show that very good HIC(d) values can be obtained using cellular polymers with a high proportion of open cells. The use of open cell foams has a further advantage in dimensional stability. A cellular polymer similar to Cellular Polymer Example 15 is tested for dimensional stability by heating separate samples to 85° C. and to 90° C. for approximately 72 hours. Dimensional stability is determining by measuring height, width and length before and after heating. This cellular polymer exhibits a dimensional change of about 1.5% at 85° C. and about 7.5-9.5% at 90° C. A closed cell cellular polymer of like density typically exhibits dimensional changes in the 5-10% range at 85° C. and 20-30% at 90° C.

Example 20

A polyurethane-polyisocyanurate foam is prepared from the following formulation:

| | |
|---|---|
| 270-OH # polyether polyol | 91.9 parts by weight |
| Catalyst | 1.0 parts by weight |
| Trimerization catalyst | 2.5 parts by weight |
| Organosilicone surfactant | 2.0 parts by weight |

-continued

| Water | 2.6 parts by weight |
| 134 eq. wt, 3.2 functional polymeric MDI | to 209 isocyanate index |

All ingredients except the polyisocyanate are blended, and the polyisocyanate is then added and mixed in. The mixture is poured into a vertically oriented polyvinylchloride pipe having a 3 inch (7.6 mm) inside diameter and a length of 12 inches (30.4 mm). The pipe has a wax release coating on its interior surface. The foam is permitted to rise freely upward within the pipe as the foam cures. After the foam cures at room temperature until it is dry to the touch, it is cured for 2 hours in a 60° C. oven, cooled and demolded. The resulting foam (Cellular Polymer Example 20) has slightly elongated cells, but is quite anisotropic in behavior, $C_V/C_T$ for this foam being approximately 0.45.

The same foam sample is tested again, this time being oriented in a direction orthogonal to that in which it exhibits is maximum compressive strength.

Cellular Polymer Example 20 exhibits a HIC(d) value of 706, when the vertical direction of the foam is oriented in the direction of impact and tested against a prototype fixture that exhibits a BIW HIC(d) value of 1,400 in the absence of any passive energy absorbing countermeasure. When tested again using the different orientation, it exhibits a HIC(d) value of only 762 under those conditions.

Examples 21-23

Cellular Polymer Example 21 is an extruded foam of a random copolymer of approximately 85% by weight styrene and 15% by weight acrylonitrile. The extrusion conditions are selected to produce mainly closed cells that are elongated in a direction orthogonal to the direction of extrusion. Average cell size in the direction of extrusion is 0.27 mm. Cellular Polymer Example 21 has a core density of 25.0 kg/m³. $C_V/C_T$ for this foam is approximately 77.4.

Cellular Polymer Examples 22-23 are similar foams having characteristics as set forth the following table. HIC(d) values are measured on 25-mm thick samples of Cellular Polymer Examples 22-23 and tested against a prototype fixture that exhibits a BIW HIC(d) value of 1,414 in the absence of any passive energy absorbing countermeasure. The foam is oriented with the direction of greatest compressive strength aligned with the direction of impact. Results are as reported in the following table.

| Example No. | Density, kg/m³ | Max. Comp. Strength, kPa | Orientation, % | Max. cell size, mm | HIC (d) |
|---|---|---|---|---|---|
| 21 | 2.50 | 481 | 77.4 | 0.27 | 681 |
| 22 | 25.2 | 496 | 76.5 | 0.22 | 707 |
| 23 | 24.9 | 442 | 68.8 | 0.28 | 708 |

What is claimed is:

1. A vehicle having at least one impact-absorbing headliner, door panel, pelvic bolster, armrest, thorax bolster, knee bolster, pillar, headrest, seat back, load floor or instrument panel located within the passenger compartment of the vehicle, the impact-absorbing headliner, door panel, pelvic bolster, armrest, thorax bolster, knee bolster, pillar, headrest, seat back, load floor or instrument panel including a cellular polymer oriented such that the direction of the highest compressive strength is oriented in an expected direction of impact of a vehicle occupant with the cellular polymer and a rigid support against which the cellular polymer is compressed during such an impact, wherein the polymer is a styrene polymer or a styrene-acrylonitrile copolymer and the cellular polymer is formed by extruding a single, continuous mass of a foamable resin mixture in a direction of extrusion, and further wherein the cellular polymer exhibits anisotropic behavior represented by $C_E/C_T$, $C_V/C_T$ and $C_H/C_T$, wherein $C_E$, $C_V$ and $C_H$ represent the compressive strength of the cellular polymer in each of three orthogonal directions E, V and H, respectively, as measured by compressing a 25-50 mm thick sample of the cellular polymer at a strain rate of 0.08 s$^{-1}$ to 25% strain, $C_T$ represents the sum of $C_E$, $C_V$ and $C_H$, and at least one of $C_E/C_T$, $C_V/C_T$ and $C_H/C_T$ has a value of from 0.50 to 0.80.

2. The vehicle of claim 1, wherein the cellular polymer has an open cell content of at least 10%.

3. The vehicle of claim 1, wherein the cellular polymer has cells having an average cell size of 0.9-3 mm in their largest dimension.

4. The vehicle of claim 1, wherein the cellular polymer exhibits an elastic limit of 3-10% strain.

5. The vehicle of claim 1, which is an automotive headliner countermeasure.

6. The vehicle of claim 5 wherein the greatest of $C_E$, $C_V$ and $C_H$ has a value of 200-600 kPa at 25% strain.

7. The vehicle of claim 6, wherein the cellular polymer exhibits a HIC(d) value of less than 800 at a nominal thickness of 25 millimeters when calculated according to FMVSS 201U against a sheet metal fixture that exhibits a (BIW) HIC(d) value of approximately 1,430 in the absence of any passive energy absorbing countermeasure.

8. The vehicle of claim 7, wherein the cellular polymer has a density of 1.5 to 2.35 pounds/cubic foot (24-35.2 kg/m³).

9. The vehicle of claim 1, which is a pelvic bolster.

10. The vehicle of claim 9 wherein the greatest of $C_E$, $C_V$ and $C_H$ has a value of 150-900 kPa at 25% strain.

11. The vehicle of claim 1, which is a thoracic bolster.

12. The vehicle of claim 11 wherein the greatest of $C_E$, $C_V$ and $C_H$ has a value of 100-500 kPa at 25% strain and the cellular polymer has a density of 1.25 to 3 pounds/cubic foot (20-48 kg/m³).

* * * * *